(No Model.)  C. GUDGELL.  5 Sheets—Sheet 1.
ELECTRIC METER.

No. 513,391.  Patented Jan. 23, 1894.

Witnesses.  Inventor.
C. Gudgell,
By Higdon & Higdon
Attys.

(No Model.) 5 Sheets—Sheet 3.
C. GUDGELL.
ELECTRIC METER.

No. 513,391. Patented Jan. 23, 1894.

Witnesses: Inventor.
C. Gudgell
By Higdon & Higdon
Attys.

(No Model.)

C. GUDGELL.
ELECTRIC METER.

Patented Jan. 23, 1894.

Witnesses:

Inventor
C. Gudgell,
By Higson & Higson
Attys.

(No Model.) 5 Sheets—Sheet 5.

C. GUDGELL.
ELECTRIC METER.

No. 513,391. Patented Jan. 23, 1894.

UNITED STATES PATENT OFFICE.

CHARLES GUDGELL, OF INDEPENDENCE, MISSOURI.

ELECTRIC METER.

SPECIFICATION forming part of Letters Patent No. 513,391, dated January 23, 1894.

Application filed June 21, 1892. Serial No. 437,436. (No model.)

*To all whom it may concern:*

Be it known that I, CHARLES GUDGELL, of Independence, Jackson county, Missouri, have invented certain new and useful Improvements in Electric Meters, of which the following is a full, clear, and exact description, reference being had to the accompanying drawings, forming a part hereof.

My invention relates to mechanism for indicating the rate of consumption of electric currents when used for electric lighting, electric power, or other purposes, and also for indicating the total amount of current-consumption during any determined period of time, and the objects of my invention are to produce an electric meter which shall be simple, compact, durable and comparatively inexpensive in construction, and also entirely automatic and perfectly reliable in its operation, and which shall, furthermore, serve to indicate clearly to the consumer the rate of current-consumption at any given time, and also the total amount of current-consumption during any given length of time.

A further object of my invention is to produce an electric meter which, in addition to the functions above enumerated, shall render the movements of the indicating apparatus equal for equal variations of current, and which shall thus operate with perfect uniformity of regularity.

A still further object of my invention is to provide the meter with a clockwork-mechanism which shall be so constructed and arranged as to be capable of automatically stopping its action whenever the consumption of current ceases and resuming its action whenever the consumption thereof begins again.

A yet further object of my invention is to provide the clockwork-mechanism with automatic rewinding attachments which shall be prompt and rapid in their action, so as to prevent all possibility of interference with the running or operation of the clockwork-mechanism.

To the above purposes, my invention consists in certain peculiar and novel features of construction and arrangement, as hereinafter described and claimed.

In order that my invention may be fully understood, I will proceed to describe it with reference to the accompanying drawings, in which—

Fig. 1$^a$ is a front elevation of an electric meter embodying my invention; the meter being of the two solenoid type used in the arrangement shown diagrammatically in Fig. 1, and the casing or housing of the meter being shown partly in transverse vertical section. Fig. 2$^a$ is a plan view of the same.

Before entering upon a detailed description of the construction and arrangement of the devices which I have shown as embodying my invention, I desire to state that the meter consists essentially of a solenoid through which the current to be measured passes, the movable core of this solenoid being mechanically connected to a series of cumulative weights which serve to equalize the movements of the core under equal variations of the current. I may also employ a second solenoid the core of which is mechanically connected to a train of indicating-gearing in such manner as to actuate such train of gearing periodically, as the circuit is periodically closed by a suitable clockwork mechanism. I may use, in lieu of the second solenoid a clockwork-mechanism which is mechanically connected to the indicating-train and which is so constructed as to either run throughout any desired period of time, or which may be provided with electrical attachments which render the clockwork-mechanism self-winding, and thus insure constant and reliable operation of said clock-work-mechanism.

Referring now to the drawings, 1 designates the base, 2 the back and 3 the sides of a casing for the operative parts of the meter. As shown, this casing or housing is of vertically elongated rectangular form, open at its front, so as to expose the interior operative mechanism, and having its two sides 3 connected together at their upper ends by a horizontal cross-bar 4 which is located near the front margins of the sides. It is to be understood, however, that the precise form of the casing may be varied, as circumstances may suggest, without departing from the essential spirit of my invention; the casing itself forming no material feature of the invention. Upon the base 1, at a point near one of the rear corners of the same, is located a vertical solenoid-coil 5, which, for purposes of clearness, I will term the "first solenoid," and the base 6 of which is secured to the base 1 of the casing by suitable screws 7, or in any other suitable or preferred manner, for retaining the coil securely in vertical position. This coil is further shown as retained in its required vertical position by an inverted L-shaped bracket 10 the vertical arm of which is secured to the inner surface of the adjacent side 3 of the casing by a bolt 11, or in any other equivalent manner, and the inner extremity of the horizontal top 8 of the coil. Within this coil works vertically a vertical core 12 which is connected at its upper end to one end of a cord 13, or a chain, or other similar flexible connection. This flexible connection 13 leads over the grooved periphery of a wheel 14 which is mounted upon a horizontal oscillatory arbor 15; said arbor being mounted in the rear part of the framework of the indicating-train, as hereinafter more fully explained. To the opposite end of this flexible connection 13 is connected the upper end of a vertically movable rod 16, the lower end of which enters a cavity or opening 17 in the base 1, this opening being located near the opposite rear corner of the base from that which is adjacent to the base of the solenoid-coil 5. At its lower end, this rod 16 carries a disk or counter-weight 18 which is retained upon the rod by a nut 19 which is screwed upon the lower extremity of the rod. Upon the base 1, at points adjacent to the cavity or opening 17, are located a number of vertical supporting standards 20 upon the upper ends of which rests a horizontal disk 21; the rod 16 passing vertically through the center of said disk, and having formed or provided with an enlargement or collar 18$^a$ which stops upon the upper side of or works through an opening in the disk. From the upper side of this disk 21 rise three, or any suitable or preferred number of vertical guide-standards 22, the inner margins of which are equidistant from the center of the disk 21, and the upper ends of which are connected and braced together by a horizontal ring or annulus 23, which thus retains the guides in their required vertical position. The inner margins of these guide-standards 22 are inclined obliquely downward and inward from the upper ends of the standards to the lower ends of the same; the form of the space inclosed between the inclined margins of the standards 22 being approximately inverted conical, and the pitch or inclination of the inclines being equal in all of the standards. Above the collar or enlargement 18$^a$, the rod 16 is loosely surrounded by a number of movable counterweights 24 which are graduated in weight according to predetermined standards and which are interposed horizontally between the inclined inner margins of the standards 22, and which furthermore successively increase in diameter from the lowest to the highest disk in accordance with the pitch of inclination of the inner margins of the standards 22. The arrangement is such that when the rod 16 is in its lowest position, the weights 24 shall be supported at their outer margins by the inclined inner margins of the guide standards 22; each weight at such time being separated a slight distance from the one next above it, and also by a similar space from the one next below it, as shown. From the ensuing description, it will be seen that as the current increases the core 12 is drawn downward within the coil 5 and the rod 16 is lifted thereby causing the enlargement or collar 18$^a$ on the rod to lift one, two, three, or more of the counterweights 24, according to the amount of increase in the current. Thus the counterweights 24 act cumulatively to render the movements of the core 12 and likewise of the wheel 14 uniform for uniform variations of current.

25 designates a second vertical solenoid-coil which rests upon the base 1, at a point immediately in front of the rod 16, and the base 26 of which is secured to the base 1 by any suitable number of screws 27, or by equivalent means, for retaining the coil in its required vertical position.

Figure 1:
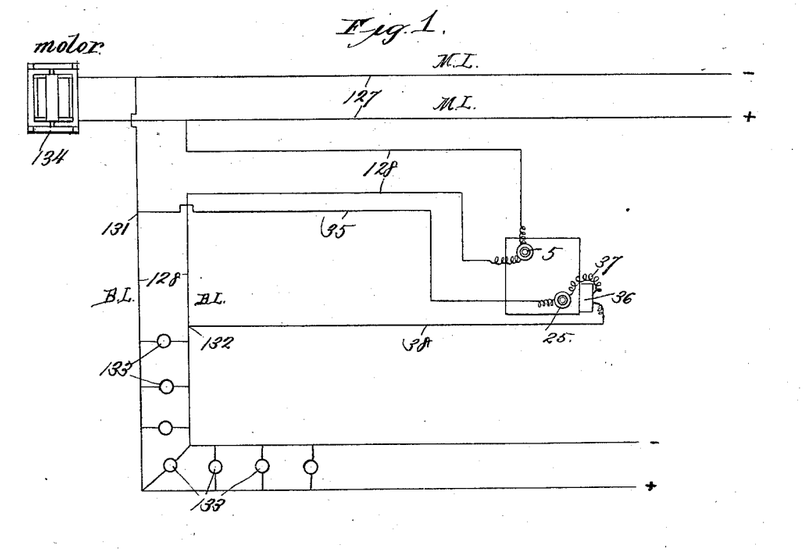
Figure 1 is a diagrammatic plan view of the electrical connections arranged for use in connection with a meter having two solenoids.
Figure 1A:
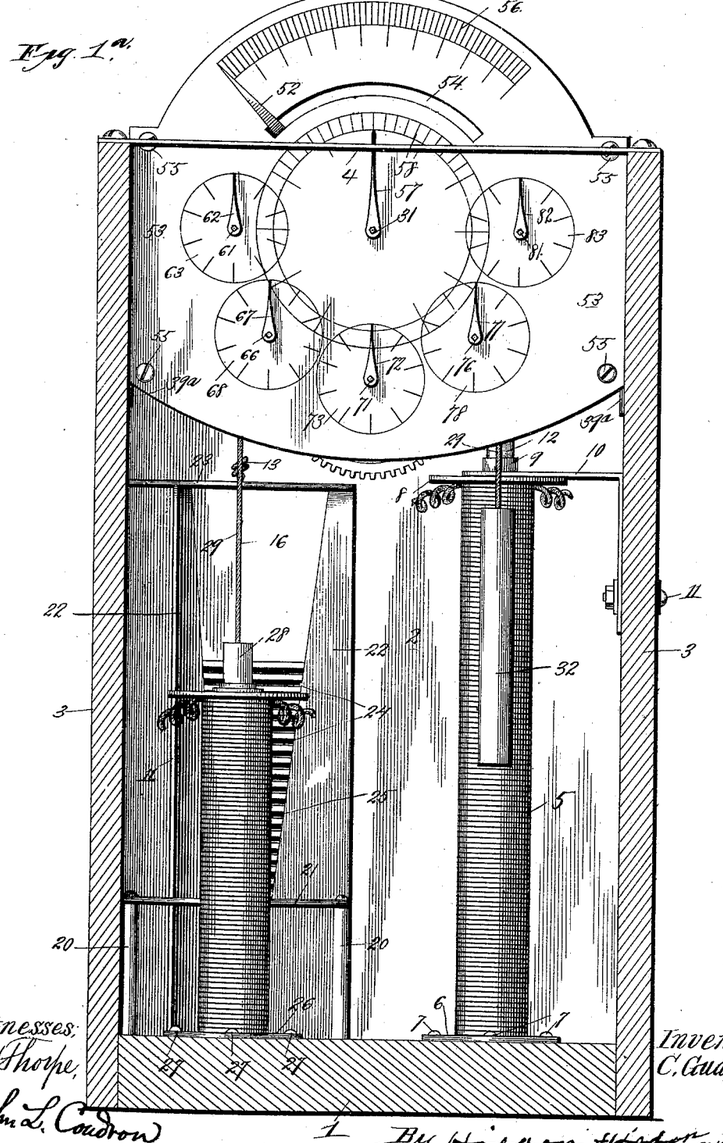
Figure 2:
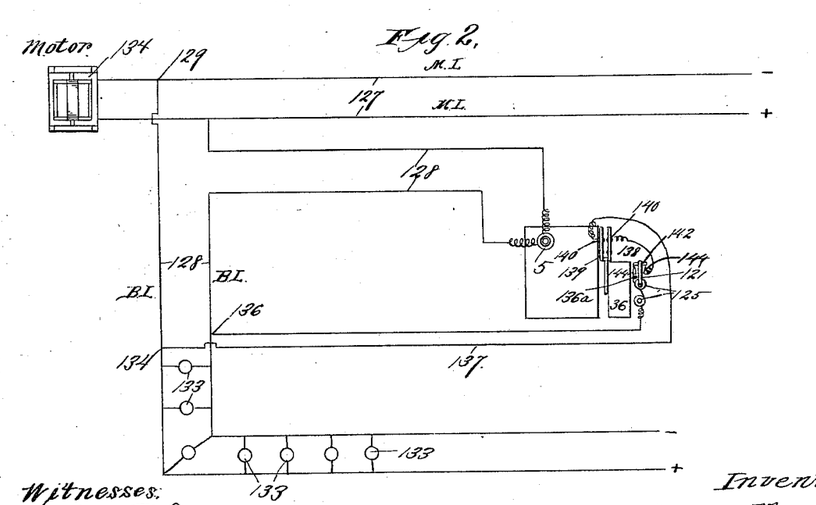
Fig. 2 is a similar diagrammatic plan view of the electrical connections used in connection with a meter having but one solenoid, and a clockwork-mechanism in lieu of the second solenoid used in Fig. 1.
Figure 2A:
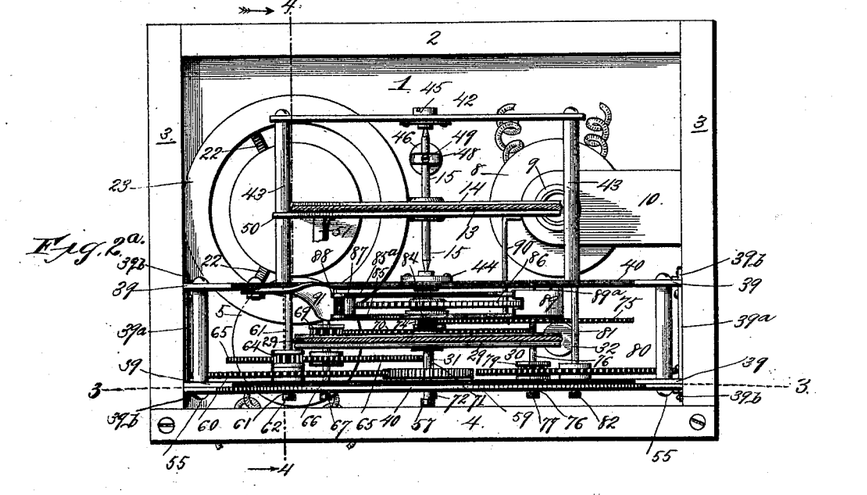
Figure 3:
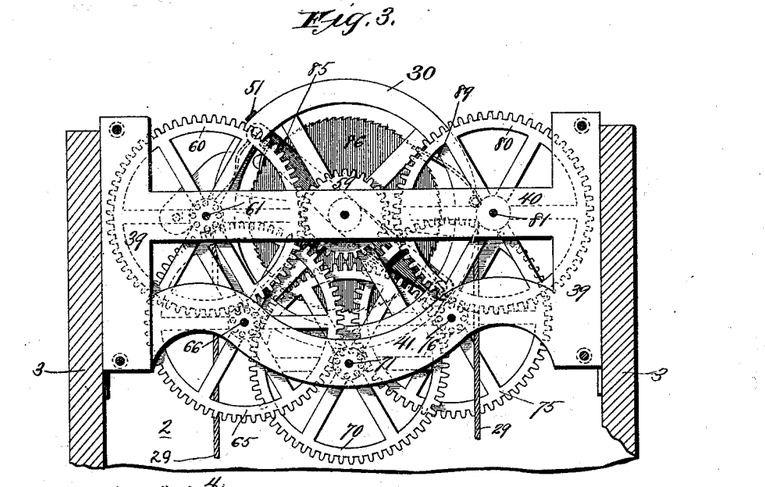
Fig. 3 is a transverse vertical section of the upper portion of the meter, on the line 3—3 of Fig. 2$^a$.
Figures 5, 6, 7, 8, 9:
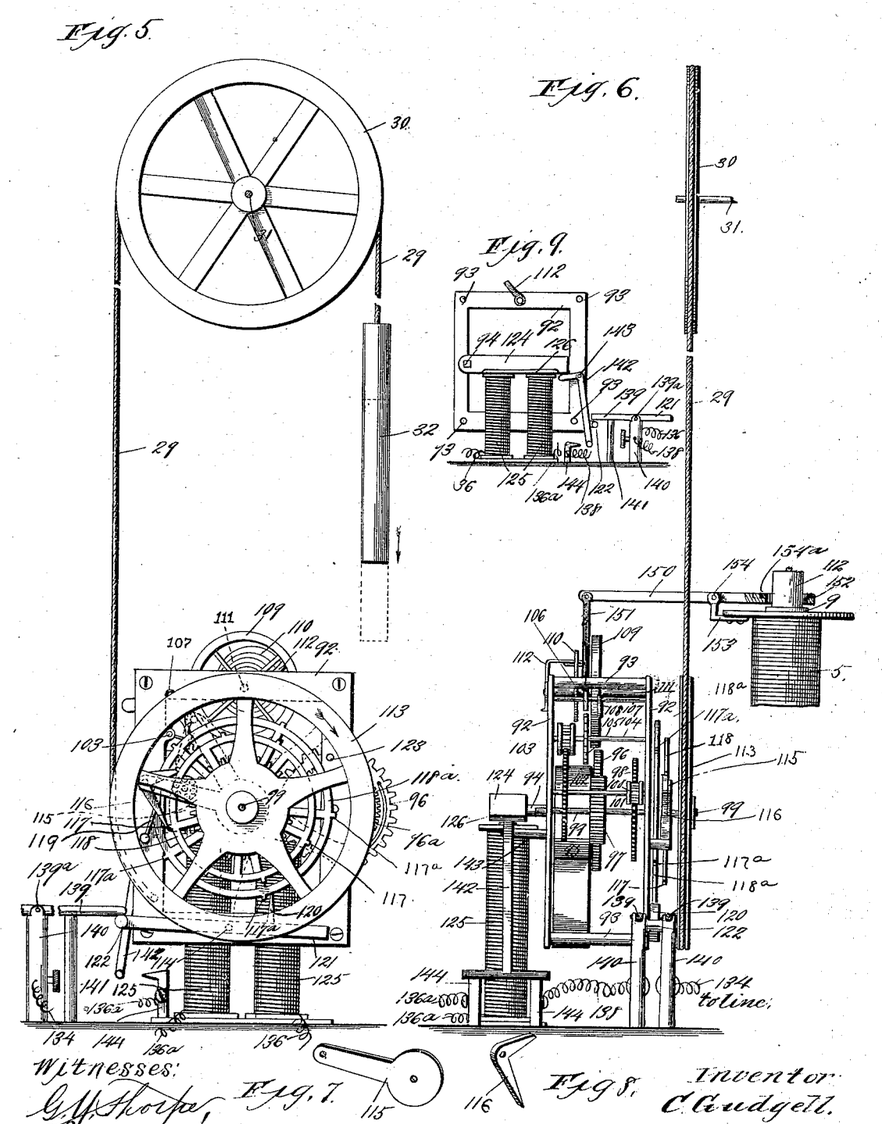
Fig. 5 is a detached view, in front elevation, of a clockwork mechanism for periodically actuating the indicating or registering mechanism of the meter.
Fig. 6 is a side elevation of the same.
Fig. 7 is a detached perspective view of the pawl-carrying arm of the tripping-mechanism.
Fig. 8 is a detached perspective view of the pawl which is carried by the arm shown in Fig. 7.
Fig. 9 is a view, in side elevation, and on a reduced scale, of the clockwork-frame and of the rewinding attachments of the clockwork-mechanism; the train of gearing being removed from the clockwork-frame.

28 designates the core of this second solenoid, the said core having vertical movement within the coil, and its upper end being connected to one end of a cord 29, or a chain, or other suitable flexible connection. This flexible connection extends over the grooved periphery of a second wheel 30 which is mounted loosely upon a horizontal rotating arbor 31, this arbor being journaled in the front part of the frame of the indicating-train in horizontal alignment with the arbor 15 of the wheel 14. To the opposite end of this flexible connection 29 is secured a single counter-weight 32 which is shown as depending directly in front of the first solenoid 5. By reference to Fig. 1, it will be seen that the first solenoid 5 is placed in the circuit of the current to be measured, 128 which is usually a branch circuit in series with the lamps 133, and motor, or other appliances using the current, the branch circuit being connected in customary manner with the main circuit 127. The second solenoid 25 is connected in multiple arc, preferably after the connections for the solenoid 5, as at 131 and 132 to the branch circuit 128, through the clock circuit-breaking mechanism 36. The clockwork-mechanism which is indicated at 36 may be as shown in Fig. 5, or it may be of any preferred type for periodically opening and closing a circuit.

It is obvious that electro magnets and armatures may be substituted for the two solenoids and cores above described, the electrical connections being the same as those just described, and the armatures of the magnets being mechanically connected to the cumulative weights and to the single pendent weight, as were the cores of the two solenoids. It is also to be observed that solenoids and cores of curvilinear form may be used in lieu of said vertically arranged solenoids and their cores; the wheel 14 being in such event centered on the horizontal axis of the movable and curvilinear core or armature in the center of motion thereof, and the flexible connection 13 passing over the wheel 14 and attached to its rim.

I will now proceed to describe the registering or indicating-mechanism which I have shown as connected mechanically to the second solenoid 25.

39 designates four vertical side-pieces of the main-frame of the indicating-gearing; these side pieces being shown as connected together by two pairs of cross-bearing bars 40 and 41, and as supported in their required position by two horizontal bars 39ª which are screwed or otherwise secured to the sides 3, at the upper parts of the same. The framework thus constructed is shown as braced against lateral displacement by four L-shaped cleats 39ᵇ which abut against the upper parts of the outer and inner sides of the framework, and which are screwed or otherwise suitably secured to the sides 3. A fifth horizontal cross-bearing bar 42 is shown as located some little distance back of the main-frame just described and is also shown as connected to said main frame by two horizontal screws 43. The ends of the rocking arbor 15 of the grooved wheel 14 are shown as conical in form, and as journaled in suitable bearings 44 and 45 which are carried by the rear cross-bars 40 and 42. This rocking arbor 15 carries near its rear end, a counter-weight 46 which is mounted upon the lower end of an arm 47; the upper end of said arm 47 being formed with a hub 48 which surrounds the arbor 15 and which is adjustable as to its position and also rigidly connected thereto by a set-screw 49. The position of this weight 46 is such that it serves to hold the rod 16 normally depressed and thus free from its cumulative weights 24 when no current is passing through the first solenoid 5. At one point upon its rim, this wheel 14 carries a radial outwardly extending tooth 50, which, when the wheel is in its normal position, engages the left hand screw or post 43 and thus prevents the wheel from turning any farther to the left; the rod 16 being in such instance at the lower limit of its movement. This wheel 14 also carries a horizontal arm 51 which is riveted or otherwise secured at its inner end to the rim of the wheel, and which is formed or otherwise provided at its outer end with an upwardly extending arm 52 which acts as a pointer or index-arm, as shown. This pointer or index-arm 52 travels along the outer side or face of a dial-plate 53, the outer end of the arm 51 working through a segmental slot 54 in the said plate. This dial-plate 53 is shown as suitably secured between the upper ends of the side-pieces 3 by screws 55, or it may be secured in other suitable manner in such vertical position, and said dial-plate is provided at its upper portion with a suitable scale 56 which is an equally graduated arc of a circle, centered with the arbor 31, in front of which the pointer 52 moves, indicating by the extent of its movement from its normal position the momentary amount or rate of current-consumption. The rotating arbor 31 above referred to, carries at its outer or front end a radial index-arm, or pointer 57 which travels over a suitable graduated circular scale 58 upon the dial-plate 53, said scale 58 being located below the scale 56 above described. At its front end portion, the arbor 31 carries a gear-wheel 59 the teeth of which mesh with the teeth of a gear-wheel 60 which is mounted upon the front end portion of a horizontal arbor 61; this arbor carrying at its front end a radial pointer 62 which travels over a suitably graduated circular dial 63 which is upon the left hand side of the dial-plate 53. The hub of this gear-wheel 60 carries a rearwardly extending pinion 64 with which meshes a gear-wheel 65, which is mounted upon a horizontal arbor 66; the front end of this arbor carrying also a radial pointer 67 which travels over a suitably graduated circular dial 68, and said dial being upon the left-hand side of the dial-plate 53 at a point below and just to the right of the dial 63. The arbor 66 of the gear wheel 65 carries, at a point some distance to the rear of the hub of said gear-wheel, a gear-pinion 69 which meshes with a gear-wheel 70; this gear-wheel 70 being mounted upon a horizontal arbor 71 which carries at its front end a radial pointer 72 which travels over a suitably graduated circular dial 73 which is placed upon the lower part of the dial-plate 53, about midway of its length. The hub of the gear-wheel 70 carries a gear-pinion 74 which meshes with a gear-wheel 75; this gear-wheel 75 being mounted upon a horizontal arbor 76 which carries at its front end a radial pointer 77, and this pointer travels over a suitably graduated circular dial 78. Upon the arbor 76 of the wheel 75 is mounted a gear-pinion 79, which is located some distance in front of the wheel 75 and which meshes with a gear-wheel 80; this gear-wheel 80 being mounted upon the front portion of a horizontal arbor 81; this arbor 81 carrying at its front end a radial pointer 82 which travels over a suitably graduated circular scale 83 which is placed at the upper right hand portion of the dial-plate 53.

It is to be understood that the arbors 61, 66, 71, 76, and 81 are journaled in the cross-bars 40 and 41 of the frame of the index-train, and it is also to be understood that while I have shown and described this particular form and arrangement of the index-train, by which the dials 63, 68, 73, 78, and 83 are arranged in segmental series beneath the dial 58, said dials may be arranged in any other suitable or preferred relation to the dial 58, so as to be readily inspected and read; the train of gearing being correspondingly arranged; and it is also to be understood that the relative proportions of the intermeshing gears of this train being preferably as one to ten, but permissibly otherwise, if preferred.

Figures 4, 10, 11, 12:
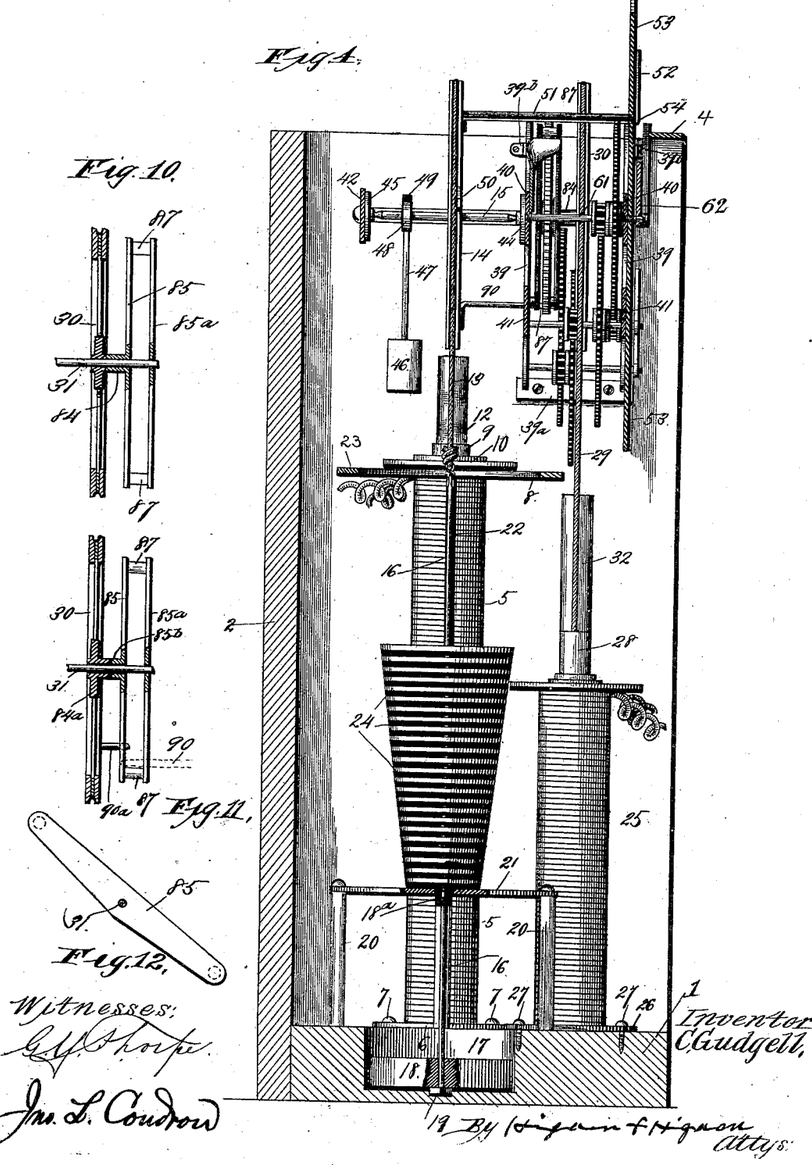
Fig. 4 is a transverse vertical section of the meter, on the line 4—4 of Fig. 2$^a$, and on a plane at right angles to the plane of the section of Fig. 3.
Fig. 10 is a detached view, partly in elevation, and partly in oblique transverse section, of the grooved wheel for the second solenoid and its pawl-carrying gravity-arms; the arrangement being that which is used in the meter shown in Figs. 1$^a$, 2$^a$, 3, and 4.
Fig. 11 is a similar view of the wheel and the arms arranged to operate in connection with a meter having a clockwork-mechanism in lieu of the second solenoid of the meter.
Fig. 12 is a detached view, in side elevation, of one of the pawl carrying gravity-arms of the meter, showing its center of motion to be eccentric of its gravity.

Now the hub of the peripherally grooved wheel 30 over which the flexible connection 29 is lead, is formed with a rearward extension 84 (see Fig. 10) to the rear end of which is rigidly secured a transverse arm 85 which extends in opposite directions from the hub-extension 84 and which lies parallel with the outer or front side of a ratchet-wheel 86; this wheel 86 being mounted upon the arbor 31 so as to turn with the same, and the extension 84 uniting with the arm 85 at a point near but not precisely at its middle. Through the extremities of this arm pass horizontal screws or spacing-pins 87 which also pass through the extremities of a second arm 85$^a$ which corresponds in form and dimensions with the arm 85 and which lies parallel with the inner or rear side of the ratchet-wheel 86; this arm 85$^a$ loosely embracing the rear end of the arbor 31 at a point near but not precisely at the middle of the length of said arm. The screw or spacing-pin 87 which connects the upper ends of the arms 85 and 85$^a$, also carries a pawl 88, which may be either a gravity-pawl, as shown, or a spring-pressed pawl, if preferred, and the tip of which engages the ratchet-teeth on the periphery of the ratchet-wheel 86. These ratchet-teeth are also engaged by a detent-pawl 89 which may either be a gravity-pawl, as shown, or a spring-pressed pawl if preferred, and which loosely surrounds a pivot-stud 89$^a$, and also serves to prevent retrograde movement of the ratchet-wheel. The tendency of the weight 32, above described, is to hold the arms 85 and 85$^a$ so that their upper ends shall lie above and to the right of the arbor 31, and so also that their lower ends shall lie in engagement with the right side of an arm 90 which extends horizontally forward from the peripherally grooved wheel 14, previously described. Normally the upper ends of the arms 85 and 85$^a$ lie in contact with the outer end of a stop-piece 91 which is shown as secured to the rear left hand upright 39 of the gearing-frame, and which extends obliquely upward and to the right from said upright. It is to be observed that while I have shown and described two arms 85 and 85$^a$ as carrying the pawl 88, the arm 85$^a$ may be dispensed with; the pawl 88 being carried by the upper end of the arm 85 alone.

From the above description it will be seen that, as the current passing through the solenoid 5 varies, it will depress the core 12 of said solenoid, thus raising the rod 16 together with one or more of the cumulative weights 24, and correspondingly oscillating the wheel 14. As this wheel oscillates, in one direction, its arm 90 leaves the lower ends of the arms 85 and 85$^a$ permitting the lower ends of said arms to move to the left, and their upper ends to move correspondingly to the right. When the clock-work 36 closes the circuit through the solenoid 25 at regular intervals, as once per minute, the core 28 is depressed thereby moving the wheel 30 and the upper ends of the arms 85 and 85$^a$ to the left until the latter strike the stop 91, and causing the pawl 88 to turn the ratchet-wheel 86 through a space that is proportional to the space on the scale 54 passed over by the pointer 52 from its normal to its then position, which space, as already shown, is indicative or representative of the amount of current strength, which is taken as an index of the current being used at that instant. This movement of the ratchet-wheel 86 is communicated by the train of indicating-gearing to the several pointers, causing them to so move as to indicate the total amount of current-consumption. At the same time, the movements of the pointer 52 constantly indicate the variations in current strength, due to the consumption of the same. It is to be further observed that when the core of the solenoid 5 is depressed, the arm 90 of the wheel 14 clears the lower ends of the arms 85 and 85$^a$, and the gravity of said arms causes the upper ends of the arms to move to the right.

In Figs. 5, 6, 7, 8, and 9, I have shown a clock-work train and certain attachments, employed in lieu of the solenoid 25 and certain of its attachments. In this instance 92 designates the frame-pieces of the clockwork-train, said pieces being shown as of open rectangular form, and as connected together by spacing-screws 93.

94 designates the winding-arbor of the train, upon which main-spring 95 is coiled in customary manner. The winding-arbor 94 carries the usual ratchet wheel 96ª and main gear-wheel 96 which carrying the usual spring-pressed pawl, meshes with a gear-pinion 97 upon the arbor 99. A gear-wheel 98, is also mounted upon the arbor 99. This gear-wheel 98 meshes with a gear-pinion 100 which is mounted upon an arbor 101, and this arbor carries a gear-pinion 102 which meshes with a gear-pinion 103 upon an arbor 104. This arbor 104 also carries an escapement wheel 105; the latter being engaged in the usual manner by the escapement-pawls 106 which are mounted upon their rocking-arbor 107. This arbor carries the usual rocking-arm 108 which is engaged by the balance wheel 109; said wheel and its hair-spring 110 being mounted upon an arbor 111, and the spring 110 being provided with the usual regulator 112. A peripherally grooved wheel 113 is mounted upon the front or outer end of the arbor 99 and in this instance the flexible connection 29 passes beneath this wheel 113 and is secured thereto by a cross-pin, or in any other equivalent manner; the said flexible connection passing thence upward and over the peripherally grooved wheel 30, as before; and the clockwork train just described being located upon the base 1 at the point occupied by the second solenoid 25 before described. The arbor 99 carries an arm 115 which extends radially outward from the arbor, and which carries at its outer end a V-shaped pawl 116 which engages at times with one or another of several teeth 117, which project radially from the periphery of a wheel 118; the arm 115 turning with the wheel 113, and independently of the arbor 99. If preferred the arm 115 may be dispensed with and the pawl 116 connected directly to one of the spokes of the wheel 113 in the same manner as to the arm 115. The wheel 118 turns with the arbor 99, and carries a second wheel 118ª the teeth 117ª of which successively engage a stud 120 which projects upward from a gravity-lever 121; this lever being pivoted 114 at one side of the middle of its length upon the lower part of the front of the framework, or upon a standard attached to the base 1, and having a metallic head 122, which serves to make a connection between the tilting terminals 139 of an opening in the circuit. The engagement is such that the clock-movement operates to cause the wheel 118 having teeth 117, to revolve to carry the arm 115 and its pawl 116 forward to the left until the pawl is caught and lifted out of engagement with the tooth 117 with which it may be in engagement, at the time, by the lower arm of said pawl coming in contact with the stop arm 119, which releases the arm 115 from its engagement with the wheel 118. This movement of the arm 115 to the left causes the flexible connection 29 to wind upon the wheel 113, and the tripping of the pawl 116 by stop-arm 119 causes the wheel to be released; thus permitting the weight 32 to drop, and revolve the wheel 113 backward to the right to its former position and also turning the wheel 30 so as to operate the train of indicating-mechanism, as before. The movement of the wheel 113 may be limited if desired by a stud 123 which projects from the adjacent side of the framework and engages one or another of two of the spokes of the wheel 113.

In order to provide for automatically rewinding the clock-work above described, I provide an electro-magnet 125 of the usual type, the coils of which are connected with the branch circuit 128, in multiple, as shown for the solenoid 25. This magnet attracts an armature 126 upon an arm 124 which is attached to and projects radially from the winding-arbor 94 of the clockwork-train, whenever the circuit through its coils is closed in the manner hereinafter described. By reason of the engagement of one of the teeth 117ª of the wheel 118ª with the stud 120 of the lever 121, the metallic head 122 is brought into contact with the two tilting terminals 139 of the opening in the circuit which are shown as pivotally connected, as at 139ª, to the upper ends of two standards 140; said standards being located adjacent to the clockwork-frame 92, and one of said standards being connected, as at 134 to one wire of the branch circuit 128 while the other standard is connected, as at 138, to one of the standards for the two contact-points 144 to be presently described. The levers 139 extend backward beyond their pivotal points 139ª, so as to be practically counter-balanced. Thus, when the tilting terminals 139 and the head 122 come into contact, the circuit is completed, and the armature-arm 124 is attracted toward the poles of the magnet 125 thereby turning the spring arbor 94 sufficient to allow its pawl to engage with another tooth of its ratchet wheel. Owing to the comparative slowness of rotation of the wheel 118ª, the engagement of the tooth 117ª with the stud 120 would be of such length of duration as to stop the action of the clockwork-train, and in order to prevent this stoppage, an inverted L-shaped arm 142 is pivoted, as at 143, upon the clockwork-frame 92. The arrangement is such that when the armature-lever 124 is drawn down the desired distance, its free end strikes the upper and short end of the said arm 142, thereby breaking the connection formed by its lower end between the points 144. Owing to its gravity, the lower end of the arm 142 normally lies in contact with two contact-standards 144; one of which is connected, as at 138, to one of the standards 140 as above stated, the other standard being connected, as at 136ª, to one terminal of the magnet coils, the other terminal thereof being connected as at 136 to the other wire of branch circuit 128. Now, as the circuit is broken, by the separation of the arm 142 from the contact-standards 144, the armature lever 126 is released from the attraction of the magnet 125 and is slowly withdrawn from the same by the reaction of the clock spring, the lever 142 resumes its position in contact with the points 144 and the lever 121 is tripped and ready in place for contact with another tooth 117$^a$ thus avoiding any stoppage of the clock in rewinding the same. So long as no current is passing through the first solenoid-coil 5, it is desirable that the clock-movement be stopped, and for this purpose, a lever 150 is pivoted as at 154, upon the outer end of a bracket-arm 153 which is secured to the upper end of the first solenoid coil 5. To the short arm of this lever 150 is attached an armature 154$^a$ which may be in the form of a ring loosely surrounding the tubular center of this solenoid, while the outermost end of said lever carries a pendent arm 151 which lies immediately above the pallet lever of the clockwork-train. Thus it will be seen that when no current is passing through the solenoid 5, the short arm of the lever is released from the attraction of the coil and the pendent arm 151 descends by gravity and rests upon the pallet lever of the clockwork-train and also in contact with the balance-wheel, stopping its movement while as soon as a current again passes through said coil, the short arm of the lever 150 is drawn down owing to the attraction of the coil, so that the arm 151 is raised out of contact with the pallet lever, and balance-wheel, permitting the clockwork-train to again operate.

The arrangement of the wheel 30 and the arms 85 and 85$^a$, previously described, is such that said arms always move with said wheel 30, and this arrangement is applicable to that type of meter in which the second solenoid 25 is used. But when the clock movement above referred to is used to actuate the registering apparatus, the arms 85 and 85$^a$, must be permitted to move independently of the wheel 30. For this purpose I use the arrangement shown in Fig. 11. In this instance, the hub 84$^a$ of the wheel 30 is separate from the arms; the arm 85 having an independent hub 85$^b$. The arms 85 and 85$^a$, in this instance are interposed between a pin 90$^a$ which is carried by the wheel 30, and the pin 90 of the wheel 14. In other respects, the construction is the same as that previously described. This independent form of movement of the arms 85 and 85$^a$ is applicable to both a meter having two solenoids or two magnets, and that having one solenoid or magnet and a clockwork-train, as above described.

From the above description it will be seen that I have produced an electric meter which is simple, strong, durable, and compact in construction, and also comparatively inexpensive and which is entirely automatic and reliable in its operation.

It is to be understood that any form of clockwork-mechanism may be substituted for the precise form shown in Figs. 5 and 6.

It is to be understood that the indicating pointers and scales of the registering or indicating attachments herein-described are equally applicable to any other form of meter wherein the proper connections obtain, which are that the division of the meter scale representing units of current be practically equal arcs of a circle with index as a radius.

Having thus described my invention, what I claim as new therein, and desire to secure by Letters Patent, is—

1. An electric meter comprising a suitable attachment placed in an electric circuit and having a movable member actuated by variations of the current, and a number of cumulative counterweights mechanically connected to the movable member of the said attachment, and arranged to be lifted and replaced by said movable member so as to equalize the movements of the same, substantially as set forth.

2. An electric meter, comprising a solenoid placed in an electric circuit and having a movable core, a number of cumulative weights connected to a flexible attachment which is also connected to the movable core, an indicating-train, and a wheel mounted in said train and engaged by the said flexible attachment substantially as set forth.

3. An electric meter, comprising a solenoid and a clock-work mechanism placed each in an electric circuit, a movable core, operating within the solenoid a train of indicating-gearing, a pair of wheels mounted in said train, a pair of flexible connections running over said wheels, and a counterweight attached to one end of one of the flexible connections, and a weight and a series of cumulative weights attached to one end of the other flexible connection, substantially as set forth.

4. An electric meter, comprising a number of vertical guide-standards having downwardly and inwardly inclined inner margins, a number of cumulative weights interposed between said inclined margins, and of varying diameters, to accord with the inclinations of said margins, a solenoid having a movable core and a flexible connection attached to said solenoid-core and also connected to said weights, substantially as set forth.

5. An electric meter, comprising a solenoid, and a clock-work mechanism, a movable core operating within the solenoid, an indicating-train, a pair of peripherally grooved wheels mounted in said train, a pair of flexible connections running each over one of said wheels and connected one to the solenoid core, and the other to the clock-work mechanism, a number of cumulative counterweights connected to the opposite end of one of the flexible connections, and a weight to counter balance the corresponding solenoid core a counterweight connected to the end of the other flexible connection, a ratchet-wheel mounted also in the indicating-train, and a pair of vibratory arms adjacent to one of the grooved wheels and having a pawl to engage the teeth of the ratchet-wheel, substantially as set forth.

6. An electric meter, comprising a train of clock-work, a peripherally grooved wheel mounted in the train, and having a flexible connection attached to its rim, a counterweight attached to said flexible connection, a radial pawl-carrying arm mounted loosely upon the arbor of said wheel, and a pair of peripherally toothed wheels one of which is engaged by the pawl of the pawl-carrying arm, and the other of which is engaged by a stud upon a tripping-lever, substantially as set forth.

7. An electric meter, comprising a train of clockwork, having a rewinding armature carried by its winding-arbor, an electro-magnet operating in connection with said armature, a peripherally grooved wheel mounted in the train and having a flexible connection attached to its rim, a counterweight attached to said flexible connection, a radial pawl-carrying arm mounted loosely upon the arbor of said wheel, and a pair of peripherally toothed wheels one of which is engaged by the pawl of the pawl-carrying arm, and the other of which is engaged by a stud upon a tripping-lever, substantially as set forth.

8. An electric-meter, comprising a suitable attachment placed in an electric-circuit and a solenoid having a movable member or core, said member or core being actuated by variations of the current, and a series of cumulative weights mechanically connected to the movable member or core, in combination with a suitable train of indicating-gearing, a ratchet-wheel, and a radial arm carrying a pawl engaging the teeth of the ratchet-wheel, and a stop-plate to limit the revoluble movement of the ratchet-wheel in one direction, substantially as set forth.

9. An electric meter, comprising a suitable train of clock-work, a rotating wheel mounted upon an arbor in said clockwork-train, and having peripheral projections or teeth, a tilting-contact lever engaged by the teeth of said wheel, a tilting-contact arm engaged by the first-named tilting arm, and a pivoted arm engaged by a rewinding armature arm, and engaging a pair of contact-standards, substantially as set forth.

10. In an electric-meter, the combination with a train of clock-work having a rewinding armature carried by its winding arbor, an electro-magnet operating in connection with said armature, a peripherally grooved wheel mounted in the train and having a flexible connection attached to its rim, and a counterweight attached to said flexible connection, of a dial-arm mounted loosely upon the arbor of said wheel, and a pair of peripherally toothed-wheels one of which is engaged by the pawl carrying arm, and a tripping-lever having a stud adapted to engage the other toothed-wheel, and a stop-plate secured to the clockwork frame and adapted to trip the pawl to allow the weight to operate the grooved-wheel, and a stop-pin or stud also secured to the clock-work frame, and adapted to limit the backward or reverse movement of the said wheel, substantially as set forth.

In testimony whereof I affix my signature in the presence of two witnesses.

CHARLES GUDGELL.

Witnesses:
HARRIET E. PRICE,
JNO. L. CONDRON.